(12) United States Patent
Hunt

(10) Patent No.: US 8,210,676 B1
(45) Date of Patent: Jul. 3, 2012

(54) SPORTSMAN'S READING GLASSES

(76) Inventor: Marvin James Hunt, Greybull, WY (US)

( * ) Notice: Subject to any disclaimer, the term of this patent is extended or adjusted under 35 U.S.C. 154(b) by 134 days.

(21) Appl. No.: 12/884,232

(22) Filed: Sep. 17, 2010

Related U.S. Application Data

(60) Provisional application No. 61/244,265, filed on Sep. 21, 2009.

(51) Int. Cl.
*G02C 5/02* (2006.01)
(52) U.S. Cl. .......... 351/133; 351/57; 351/121; 351/155; 2/445; 2/209.13
(58) Field of Classification Search ............ 351/41, 351/47, 51, 57, 58, 111, 119, 121, 124, 133–135, 351/155, 158; 2/10, 12, 13, 173, 209.13, 2/445
See application file for complete search history.

(56) References Cited

U.S. PATENT DOCUMENTS

| | | | |
|---|---|---|---|
| 677,996 A | 7/1901 | Kleinert | |
| 2,594,395 A | 4/1952 | Castelli | |
| 2,781,693 A | 2/1957 | Brumby | |
| 4,834,523 A | 5/1989 | Porsche | |
| 5,098,180 A | 3/1992 | Tobey | |
| 5,129,102 A | 7/1992 | Solo | |
| 5,467,148 A | 11/1995 | Conway | |
| 5,491,842 A | 2/1996 | Braswell-Moore | |
| 5,533,208 A | 7/1996 | Tonoyan et al. | |
| 5,579,062 A | 11/1996 | Sondrol | |
| 5,587,747 A | 12/1996 | Bernheiser | |
| 5,692,234 A | 12/1997 | Yuen | |
| 5,898,935 A | 5/1999 | Davis | |
| 5,930,834 A | 8/1999 | Toovey | |
| 6,079,052 A | 6/2000 | Veridiano | |
| 6,174,058 B1 | 1/2001 | Hsiao | |
| 6,247,205 B1 | 6/2001 | Damadian et al. | |
| 6,275,992 B1 | 8/2001 | Bondy | |
| 6,276,796 B1 | 8/2001 | Lindberg et al. | |
| 6,428,165 B1 | 8/2002 | Rivera | |
| 6,553,570 B1 | 4/2003 | Flynn | |
| 6,611,959 B1 * | 9/2003 | Lando | 2/10 |
| 6,612,695 B2 | 9/2003 | Waters | |
| 6,959,989 B2 | 11/2005 | Holm | |
| 7,013,491 B2 | 3/2006 | Ferrara | |
| 7,051,406 B1 | 5/2006 | Morris et al. | |
| 7,100,215 B2 | 9/2006 | Shiue | |
| 7,125,116 B1 | 10/2006 | Chiu | |
| 7,163,289 B2 | 1/2007 | Wedeck et al. | |
| D547,531 S | 7/2007 | Wilson et al. | |

(Continued)

OTHER PUBLICATIONS http://softexpressions.com/software/notions/Magni.html—p. 2 of 10—I4U Reading glasses—Sep. 29, 2008—1 page.

(Continued)

*Primary Examiner* — Huy K Mai
(74) *Attorney, Agent, or Firm* — Patent Law Offices of Rick Martin, P.C.

(57) ABSTRACT

A fisherman can clip a left reading glass frame to the left side of his visor. He can clip a right reading glass frame to the right side of his visor. He can bend the flex arm connected to the clip to store each lens above the visor in a passive mode. When reading glass focus is needed, perhaps to tie the fly onto the leader, he bends each frame half down in front of his eye and connects the two halves to provide a pair of reading glasses.

20 Claims, 8 Drawing Sheets

U.S. PATENT DOCUMENTS

| | | | |
|---|---|---|---|
| 7,240,370 B2 * | 7/2007 | Lerner | 2/10 |
| 7,258,436 B2 | 8/2007 | Heil | |
| 7,325,255 B2 | 2/2008 | Cunliffe | |
| 7,344,241 B2 | 3/2008 | Baek | |
| 7,524,055 B2 | 4/2009 | Schepke et al. | |

OTHER PUBLICATIONS http;//www.debspecs.com/Clip_Flip_Magnifiying_Glasses_p848.cfm—p. 1 of 1—Clip&Flip Magnifying Glasses @DebSpecs Store—Sep. 29, 2008—1 page.

Amazon.com:Eagle Eyes 365 Clip-on sun glasswa-Night/day Vision Sunglasses-Snow—http://amazon.com/eagle-eyes-365-clip-glasses/dp/B0009WFV3U—see p. 1 of 6. Sep. 29, 2008—6 pages.

http://www.ctswholesalesunglasses.com/index.asp?PageAction=VIEWCATS&Category=70—wholesale clip on sunglasses, p. 1 of 2, Sep. 29, 2009—2 pages.

http://etrade.daegu.go.kr/co/championshipgolf/GC01397466/CA01397474Cap_Sunglasses.html Cap sunglasses—6 pages of cap sunglasses Views. (Clip N Flip)—Sep. 29, 2008.

http://softexpressions.com/software/notions/Magni.html—a variety of magnification products to wear over glassses, clip on lights . . . 10 pages of assorted views.—Sep. 29, 2008.

* cited by examiner

US 8,210,676 B1

SPORTSMAN'S READING GLASSES

CROSS REFERENCE APPLICATIONS

This application is a non-provisional application claiming the benefits of provisional application No. 61/244,265 filed Sep. 21, 2009.

FIELD OF INVENTION

The present invention relates to providing clip on eyeglass frame halves that rest passively on a cap or hardhat until the user bend's the frame to support a left and a right frame half in front of his eyes to read a map for example.

BACKGROUND OF THE INVENTION

It is known to attach an eyeglass frame to a cap. Representative of the art is U.S. Pat. No. 7,125,116 (2006) to Chia. The visor of a cap supports a left and a right clip. Each clip has a ratcheting, circular rotating mount for a clamp to an eyeglass lens. A single plastic lens is rotationally supported under the visor of the cap. Other related art is summarized below.

U.S. Pat. No. 677,996 (1901) to Kleinert discloses a two piece eyeglass retained on a user's nose with a spring bridge.

U.S. Pat. No. 2,594,395 (1952) to Castelli discloses an upper and a lower part eyeglass frame.

U.S. Pat. No. 2,781,693 (1957) to Brumby discloses an eyeglass frame with snap together segments to interchange lenses.

U.S. Pat. No. 4,834,523 (1992) to Porsche discloses an interchangeable lens frame.

U.S. Pat. No. 5,098,180 (1992) to Tobey discloses an interchangeable lens frame.

U.S. Pat. No. 5,467,148 (1995) to Conway discloses an interchangeable lens frame.

U.S. Pat. No. 5,579,062 (1996) to Sondrol discloses an interchangeable lens frame.

U.S. Pat. No. 5,587,747 (1996) to Bernheiser discloses an interchangeable lens frame.

U.S. Pat. No. 6,276,796 (2001) to Lindberg et al. discloses an eyeglass frame with temple bars.

U.S. Pat. No. 6,428,165 (2002) to Rivera discloses a bifocal frame.

U.S. Pat. No. 7,100,215 (2006) to Shiue discloses goggles with changeable lenses.

U.S. Pat. No. 7,524,055 (2009) to Schepke et al. discloses an eyeglass frame with interlocking lenses.

U.S. Pat. No. 7,163,289 (2007) to Wedeck et al. discloses a cam arm lock lenses.

Fly fishermen as an example generally do not need reading glasses. But when trying to tie the fly onto the leader using very fine fishing line, reading glasses help! What is needed in the art are inexpensive eyeglass frames (for reading glass lenses or other lenses) which clip onto a cap or hardhat. The left and right lenses should be independent to allow bending them up and out of the way. For use each half is folded down, then the pair of lens frames are connected together at the bridge of the nose. This is the design of the present invention.

SUMMARY OF THE INVENTION

The main aspect of the present invention is to provide a two part eyeglass frame, a left and a right lens frame, wherein a temporary connection can be made to join the two halves together.

Another aspect of the present invention is to provide a flexible support arm for each frame half.

Another aspect of the present invention is to provide a clamp on the flexible support arm for attachment to a visor, hardhat and the like.

Other aspects of this invention will appear from the following description and appended claims, reference being made to the accompanying drawings forming a part of this specification wherein like reference characters designate corresponding parts in the several views.

A lens such as a non-prescription reading lens is supported by a left and a right flexible frame arm. Each flexible frame arm extends rearward two to three inches from each lens frame half. The frame halves can be temporarily joined via a magnet connection or a simple hook and loop. At the rear end of each flexible frame arm is a clamp suited to clip onto a visor or the like.

In the passive mode each frame half is folded up above the visor and out of the way. During use each frame half is bent down to the user's bridge of the nose, and the halves are connected together to form a pair of (reading) glasses.

One embodiment uses inexpensive non-prescription reading lenses forming sportsman's economical outdoor reading glasses.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
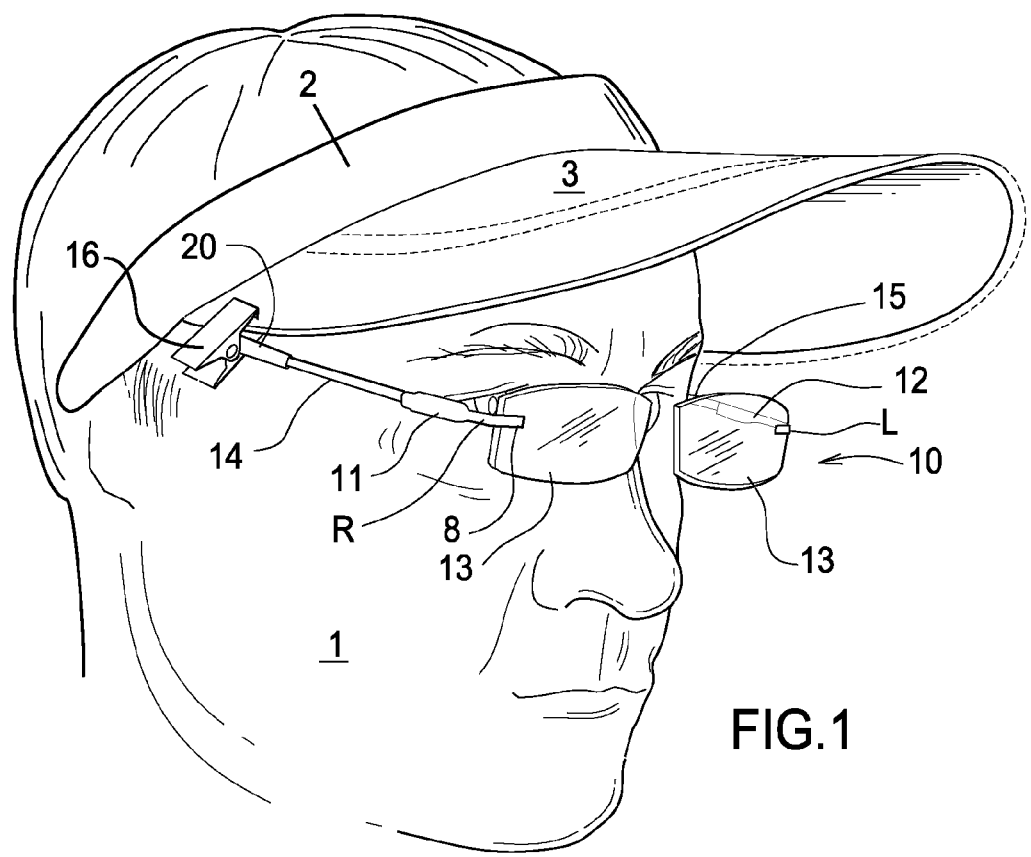
FIG. 1 is a front perspective view of a preferred embodiment in use on a visor.
Figure 2:
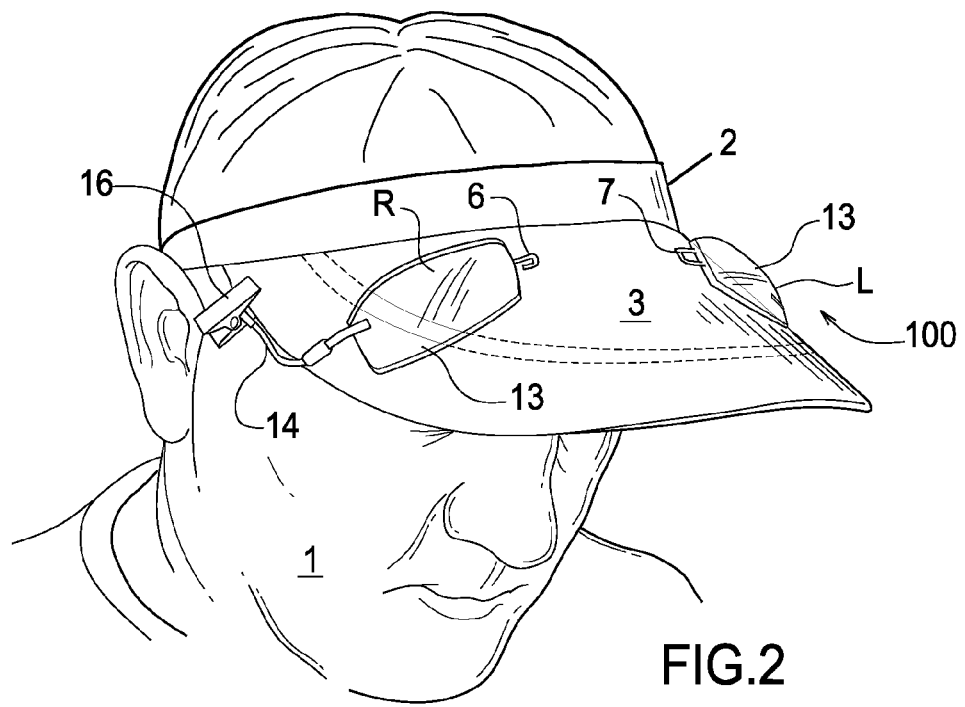
FIG. 2 is a front perspective view of an alternative embodiment having attachable halves with the lenses sitting on the visor.

Referring first to FIG. 1 a user 1 (fisherman) wears a visor headpiece 2 with a visor 3 to shade the eyes. The two part reading glasses 10 consist of a left half L and a right half R. Each half L and R has a lens 13 and a flex arm 14. The flex arm 14 attaches to the lens 13 at joint 8 and attaches to the clamp 16 at joint 20. Lens clamps 11, 12 are known in the art, and they connect the lens 13 to the flex arm 14. In FIG. 2 hook 6 is removed from loop 7 in glasses 100. The flex arms 14 are bent up allowing the lens 13 to be stored in a passive mode above the visor 3.

Figure 3:
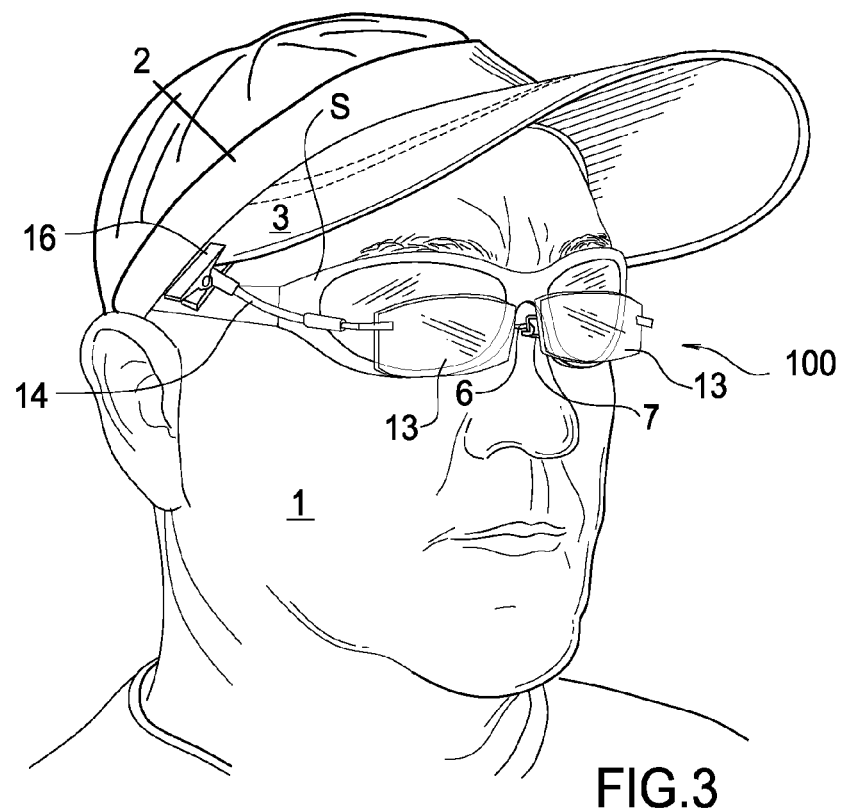
FIG. 3 is a front perspective view of the embodiment shown in FIG. 2 in use with a pair of dark glasses.

Referring next to FIG. 3 the user 1 wears a pair of sunglasses S. The two part reading glasses 100 to allow the user 1 to perform close in focus work such as tying a thin fishing line into a fly even in the bright sunlight.

Figure 4:
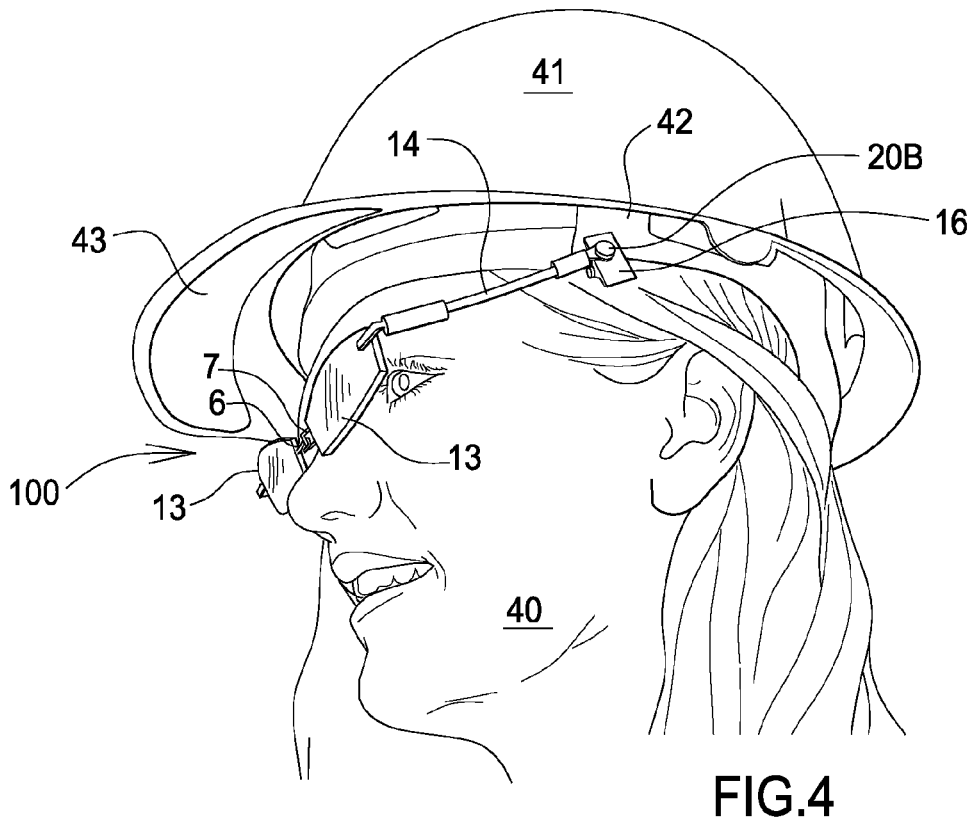
FIG. 4 is a side perspective view of the embodiment shown in FIG. 2 attached to a hard hat.

In FIG. 4 the user 40 wears a hard hat 41 that has a headband 42. The two part reading glasses 100 are shown in the active mode, connected at the user's bridge of the nose for reading (a blueprint) on the jobsite. The joint 20B is a simple rivet attaching a flattened rear end of the flex arm 14 to one side of the clamp 16. In the passive mode the lenses 13 can be stored above the visor 43.

Figure 15:
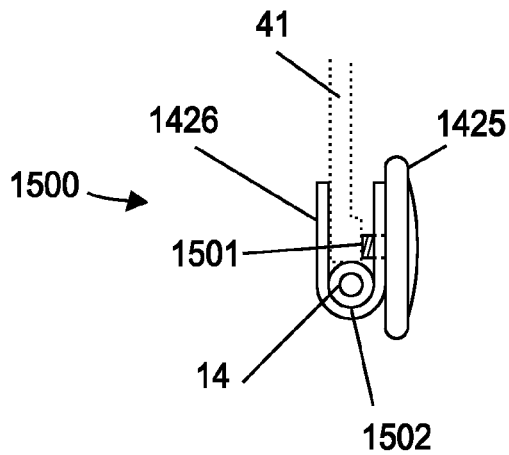
FIG. 15 is a front elevation view of a screw type clamp.
Figure 16:
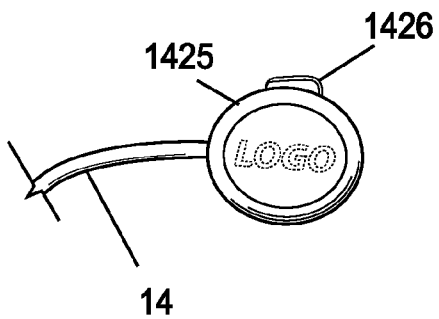
FIG. 16 is a side elevation view of the FIG. 15 clamp.

Referring next to FIGS. 15, 16 a preferred clamp 1500 would replace clamp 16 of FIG. 4. Clamp 1500 attaches to the hard hat 41 itself (or any head gear desired) and not the headband 42. Clamp 1500 consists of a U shaped clasp 1426 which houses the hard hat 41 shown in dots. A screw type bolt 1501 threads through the U shaped clasp 1426 via a circular head 1425 on the bolt 1501. The circular head 1425 may have an advertising logo as shown in dots. The flex arm 14 is shown fastened onto the U shaped clasp 1426 by means of solder or crimping a collar 1502 or an equivalent. Thus, the user places the clasp 1426 on a desired location on the hard hat 41 and then tightens the bolt 1501 via the head 1425.

Figure 5:
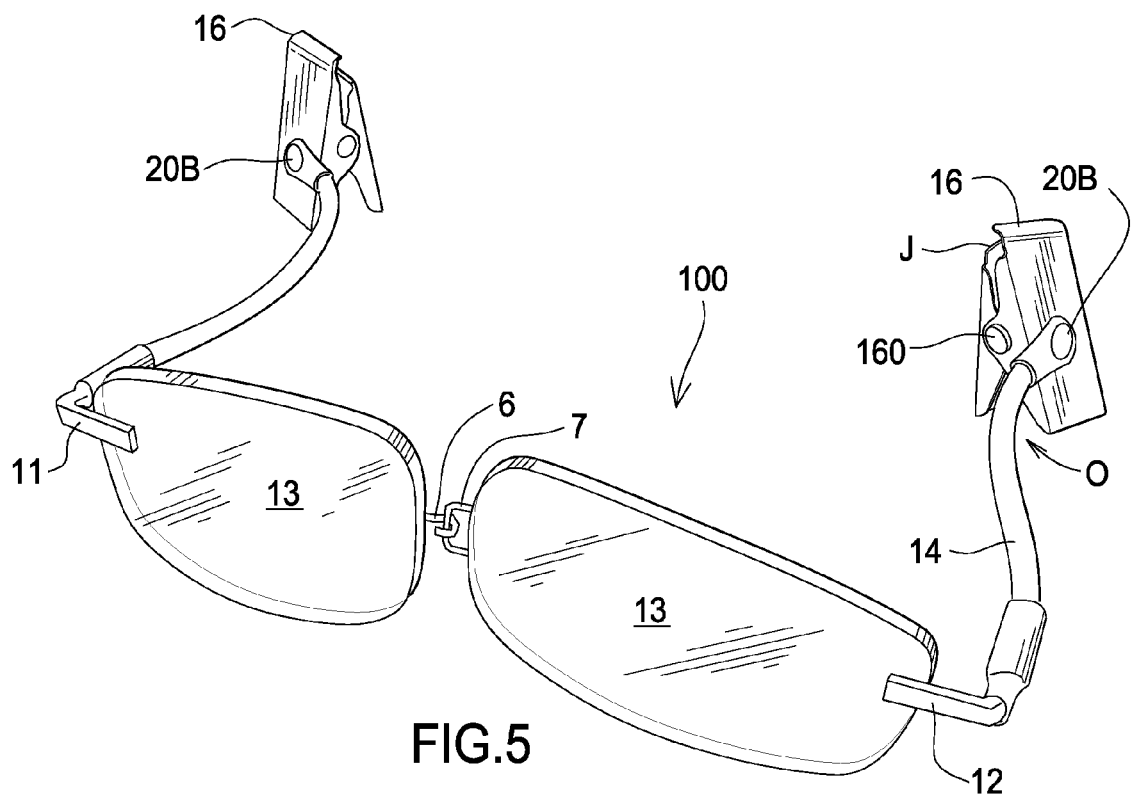
FIG. 5 is a front perspective view of the embodiment shown in FIG. 2.

In FIG. 5 the clamp 16 is known in the art. The jaws J are opened by squeezing the clamp halves at O. An internal spring mounted on hinge pin 160 biases the jaws closed. In some embodiments the hook 6 and loop 7 are removed as shown in FIG. 1 glasses 10.

Figure 6:
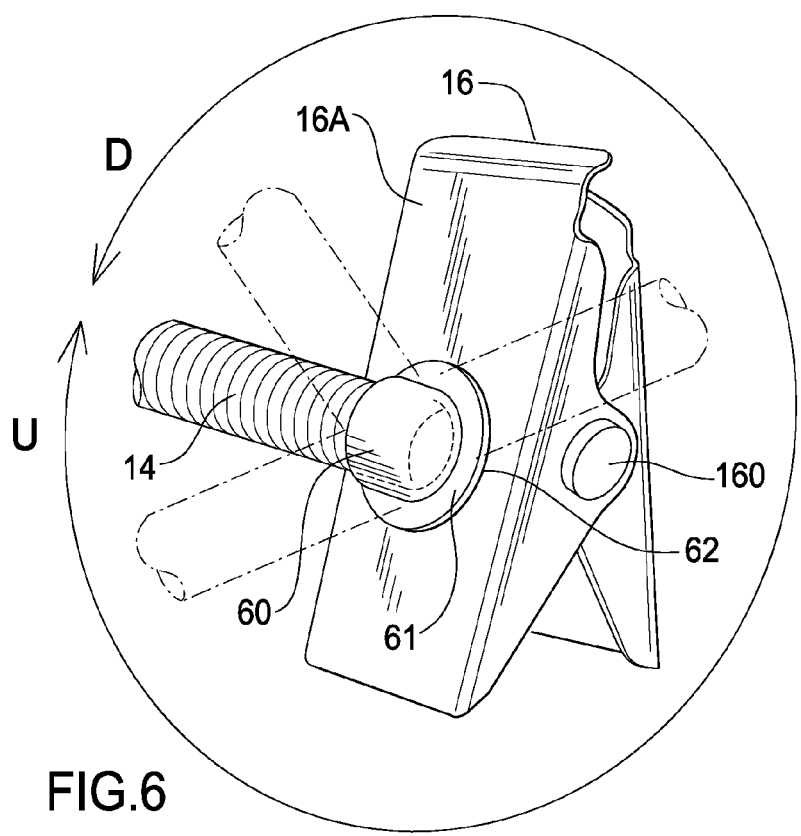
FIG. 6 is a close up view of an alternate clamp embodiment.

Referring next to FIG. 6 the clamp 16 has been fitted with rotating discs 61, 62. disc 62 is glued to clamp arm 16A so that the flex arm end 60, which is glued to disc 61, can be adjusted up and down as shown by arrows U, D.

Figure 7:
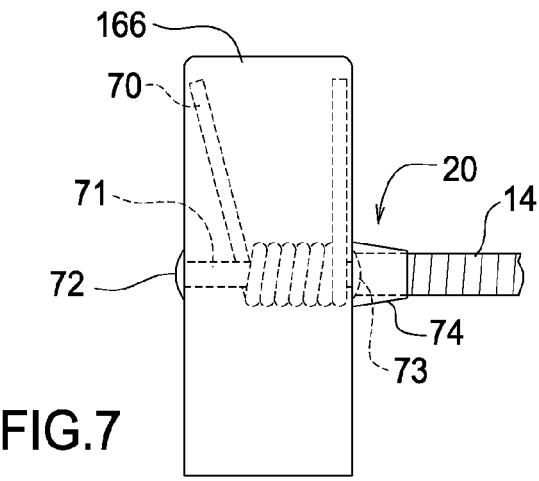
FIG. 7 is a side elevation view of another alternate clamp embodiment.
Figure 8:
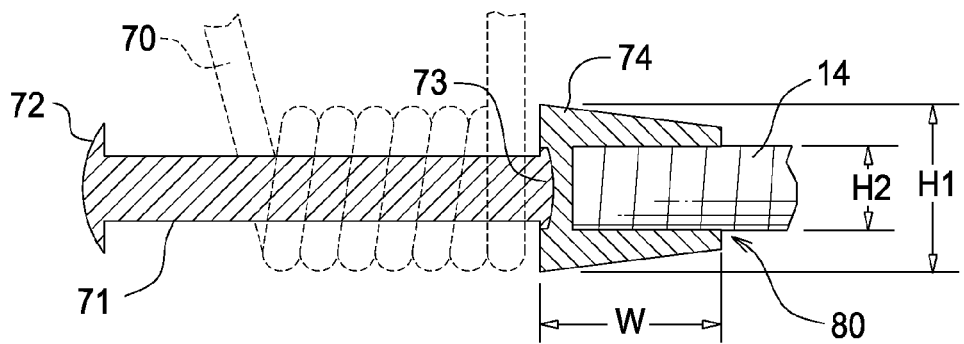
FIG. 8 is a cross sectional view of the clamp shown in FIG. 7.
Figure 9:
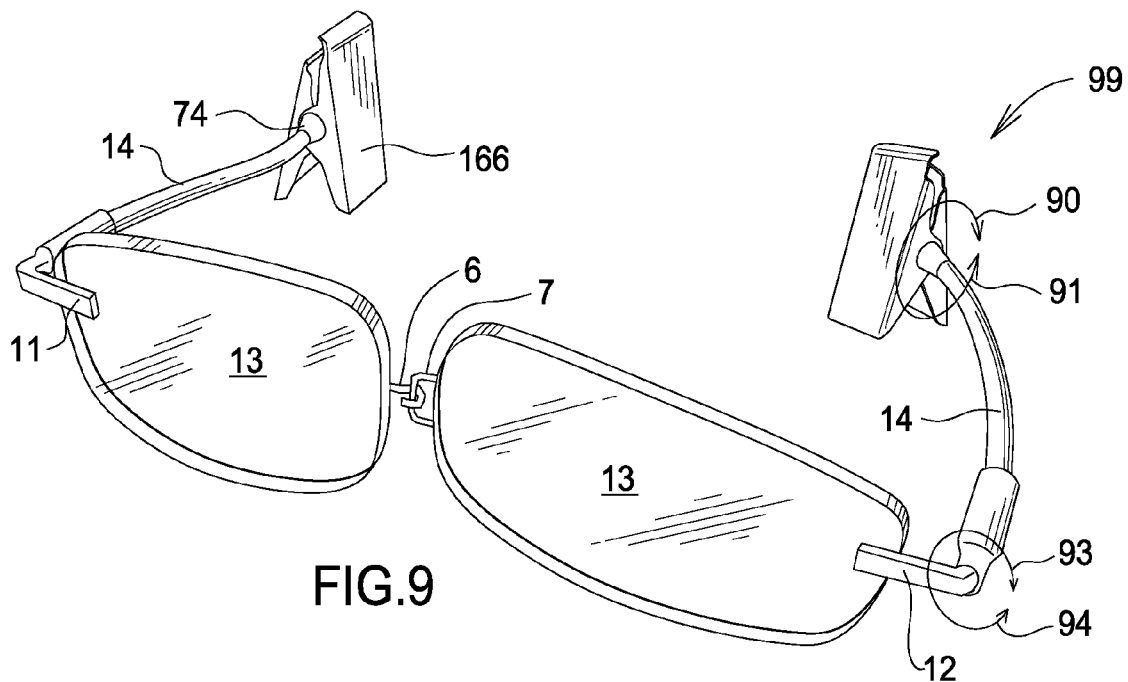
FIG. 9 is a front perspective view of the embodiment using the clamp of FIGS. 7, 8.

Referring next to FIGS. 7, 8, 9 the joint 20 customizes the clamp 166 so that it is integrated into the flex arm 14. The hinge pin 71 has a rear head 72 and a forward head 73. The forward head 73 is imbedded in a cone connector 74 which in turn attaches to the flex arm 14 via hole 80. Nominal dimensions are H1=¼", H2=⅛", W=¼". The spring 70 is the same as used in clip 16 of FIG. 1. The two piece eyeglass 99 offers a streamline appearance. Arrows 90, 91, 93 94 indicate rotational flexibility of the flex arm assembly.

Figure 10:
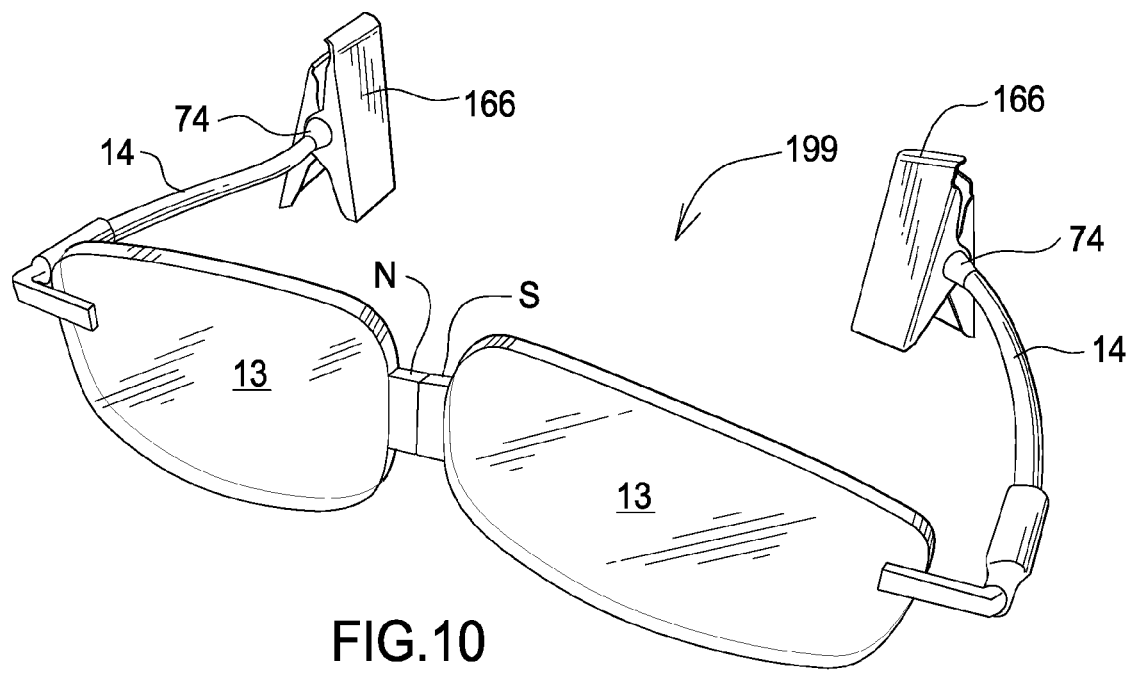
FIG. 10 is a front perspective view of a magnet coupler embodiment.

Referring next to FIG. 10 the magnet pair N, S connect the lenses 13 together in two piece eyeglasses 199.

Figure 11:
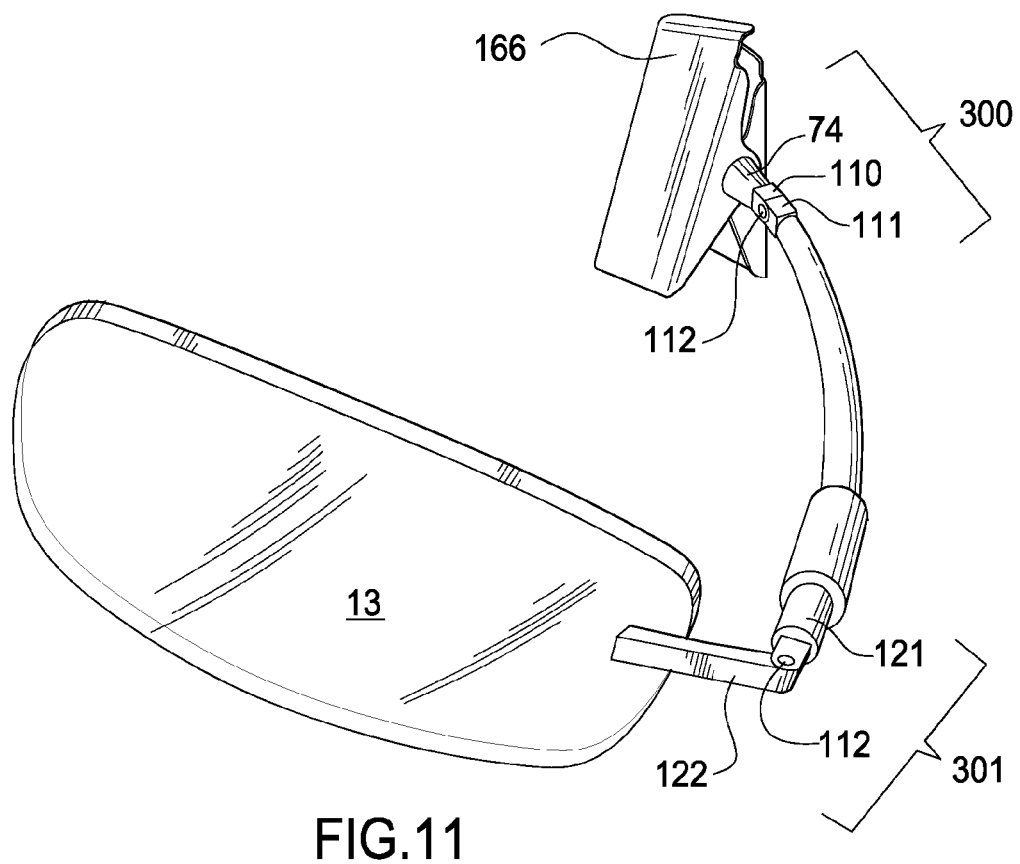
FIG. 11 is a front perspective view of a hinged embodiment.

Referring next to FIG. 11 hinges 300, 301 are added either at one or both ends of flex arm 14. Hinge 300 consists of hinge halves 110, 111 with a hinge pin 112. Hinge 301 consists of hinge halves 121, 122 with hinge pin 112.

Figure 12:
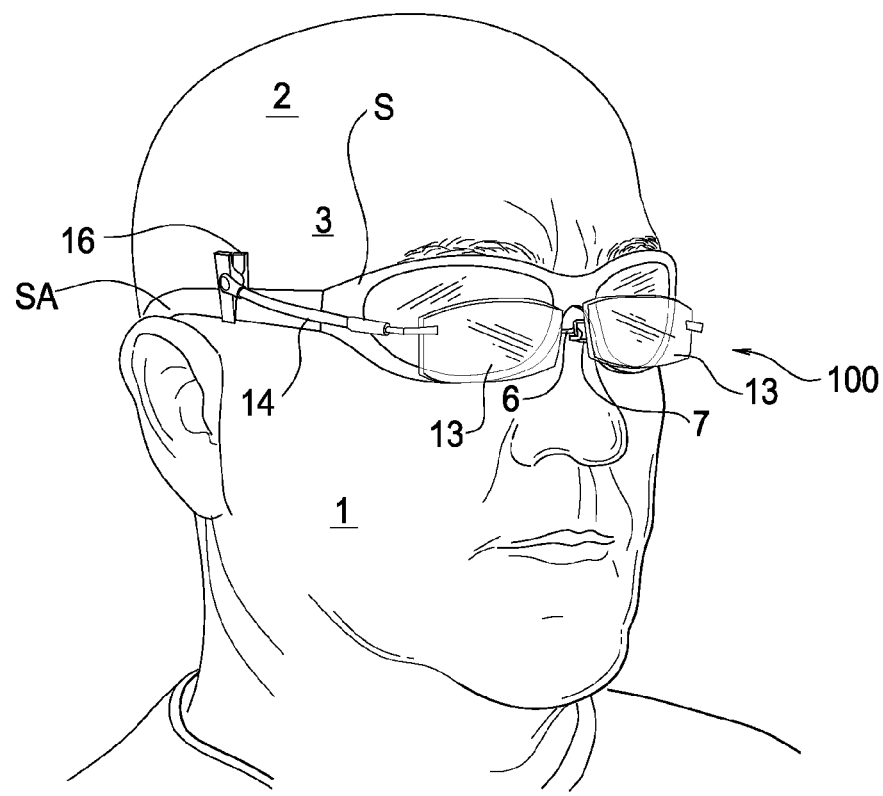
FIG. 12 is a front perspective view of the FIG. 2 embodiment hooked to dark glasses.
Figure 13:
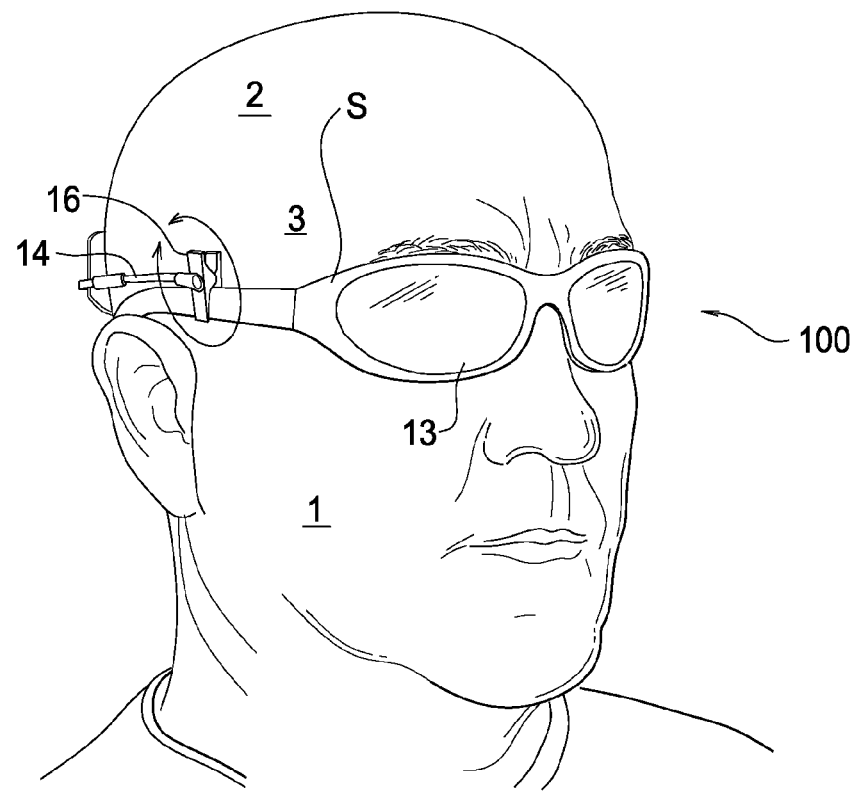
FIG. 13 is the same view as FIG. 12 with the lenses folded back in a passive mode.

Referring next to FIGS. 12, 13 the combination of sunglasses S with support arms SA along with glasses 100 create a new invention.

As shown the clamp 16 attach to the support arms SA. The active mode is shown in FIG. 12. The passive mode shown in FIG. 13 has the flex arms 14 folded back behind the user's ears.

Figure 14:
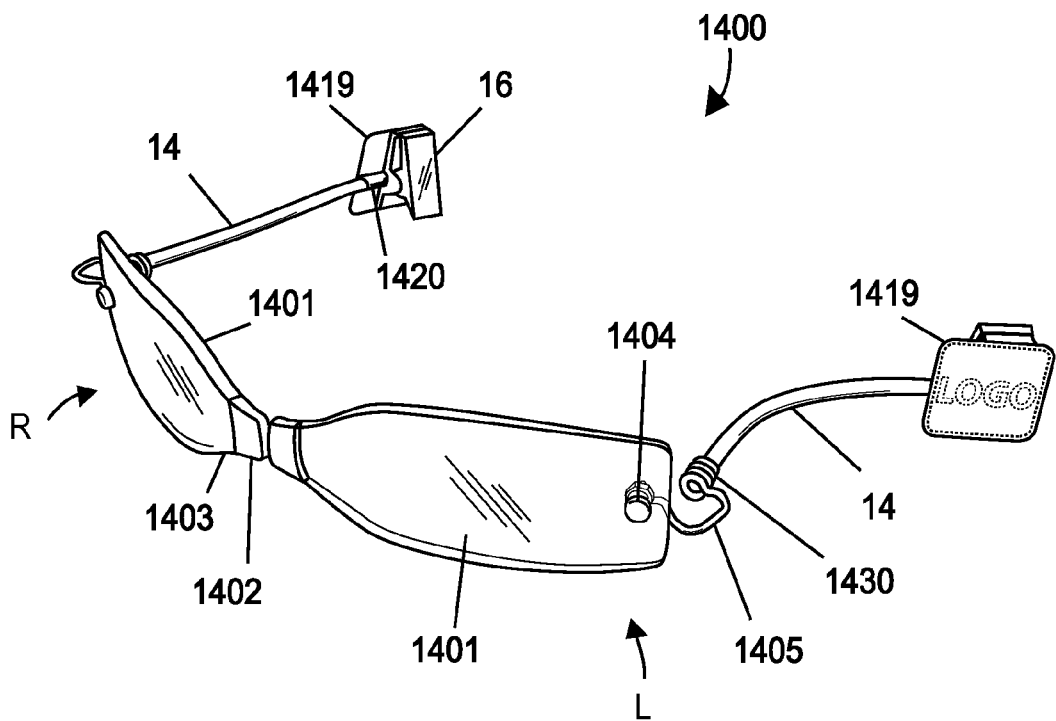
FIG. 14 is a front perspective view of another magnet type embodiment.

Referring next to FIG. 14 a two piece eyeglass 1400 is shown. Each lens 1401 has a coupling magnet 1402 at its nose segment 1403. The outside edge of each lens 1401 has a nut and bolt assembly 1404 which connects an end of the U shaped connector 1405 to the lens 1401. The U shaped connector 1405 serves as a wire form working in conjunction with the flex arm 14 to adjust the position of the clamp 16. The clamp 16 is fastened by glue or solder (or an equivalent including a press fit and a bolt) to a placard 1419. The outside of the placard 1419 may have a logo thereon as shown. The inside of placard 1419 has an anchor 1420 fastened thereto by glue or solder or an equivalent. The anchor 1420 secures the proximal end of the flex arm 14 to the placard 1419 and clip 16 assembly. Each clip 16 can be fastened to a visor or sunglasses, see FIGS. 1, 4 and 12. The flex arm 14 is press fit into the coil end 1430 of the U shaped connector 1405.

Figure 17:
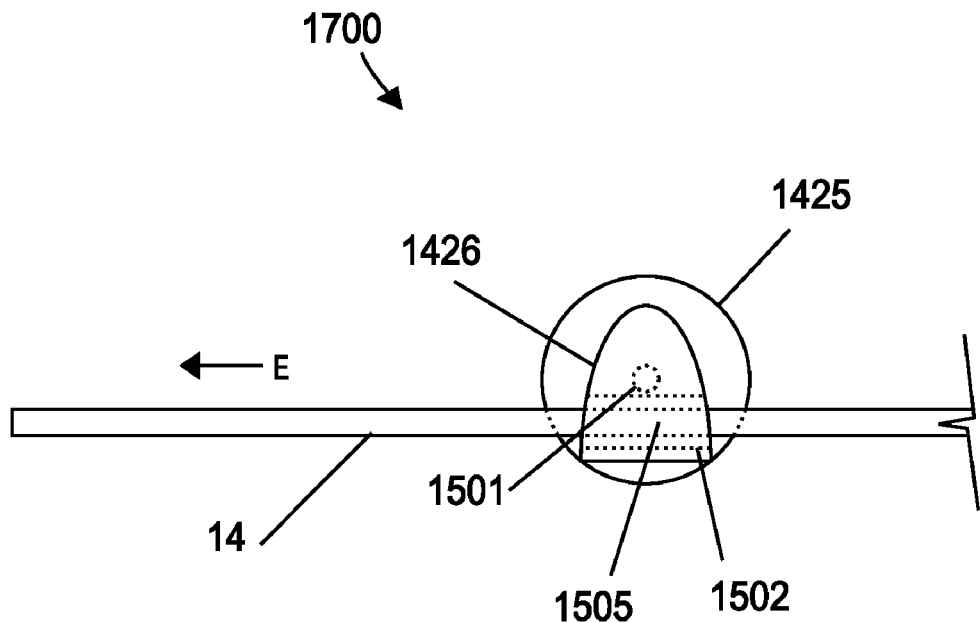
FIG. 17 is a side elevation view of another embodiment of a screw type clamp.

Referring next to FIG. 17 a clamp 1700 provides that clasp 1426 is slidable along flex arm 14. The collar 1502 has a sleeve 1505 which drags along flex arm 14 so as to allow it to slide, yet affixes it by friction from the sleeve to a desired position.

Figure 18:
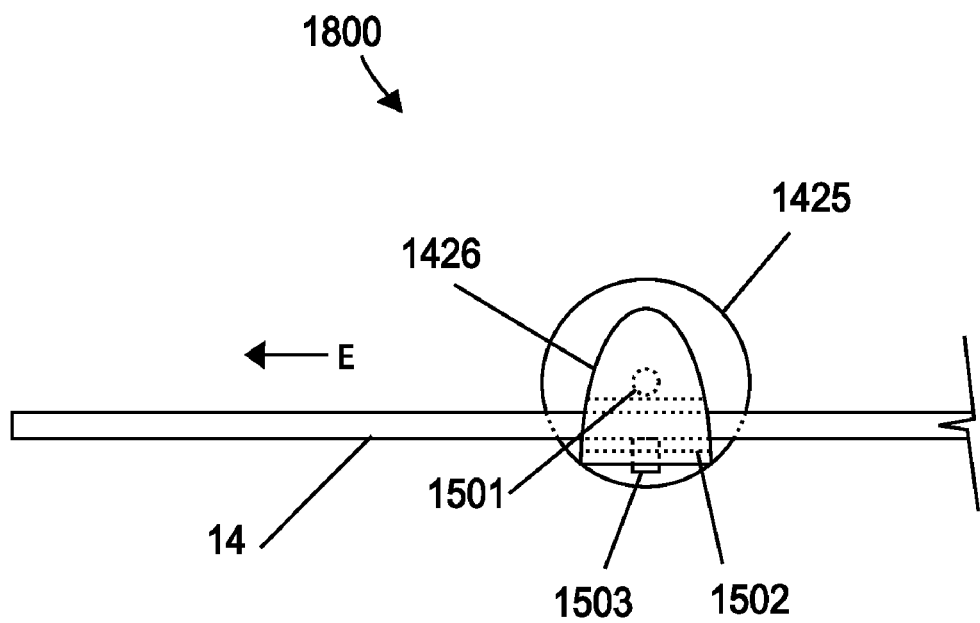
FIG. 18 is a side elevation view of another embodiment of a screw type clamp.

Referring next to FIG. 18 the clamp 1800 allows clasp 1426 to slide along flex arm 14. A set screw 1503 locks the collar 1502 to a desired position along flex arm 14. Flex arm 14 may be a longer length such as six inches in embodiments 1500, 1700 and 1800.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A two part eyeglass comprising:
   a left half and a right half;
   each of said halves being mirror images of each other;
   each half further comprising a lens with an outside edge having a fastener connecting a distal end of a flex arm thereto;
   said flex arm having a pliable construction with a memory to its last position; and
   said flex arm having a proximal end with a spring loaded clamp.

2. The eyeglass of claim 1, wherein each lens further comprises a nose segment having a connector for its mirror image lens.

3. The eyeglass of claim 2, wherein the connector further comprises a hook and a loop.

4. The eyeglass of claim 2, wherein the nose segment connector further comprises a magnet.

5. The eyeglass of claim 4, wherein the fastener further comprises a wire form, one end of the wire form connected to the lens, one end of the wire form connected to the flexarm.

6. The eyeglass of claim 5, wherein the spring loaded clamp further comprises a placard.

7. The eyeglass of claim 1, wherein the proximal end of the flex arm further comprises a flattened segment connected to the clamp via a rivet.

8. The eyeglass of claim 1, wherein the clamp further comprises a pair of rotatable discs, wherein an inner disc is fastened to the clamp, and an outer disc is fastened to the proximal end of the flex arm, and wherein the outer disc and flex arm can be rotated relative to the inner disc.

9. The eyeglass of claim 1, wherein the proximal end of the flex arm further comprises a cone connector which is attached to a forward head of a clamp hinge pin, wherein the clamp can rotate around the hinge pin while the flex arm remains stationary.

10. The eyeglass of claim 1, wherein the fastener further comprises a hinge.

11. The eyeglass of claim 1, wherein the proximal end of the flex arm further comprises a hinge.

12. A two piece eyeglass comprising:
a left half which is a mirror image of a right half;
each half having a lens with a magnet at its nose oriented edge and a fastener at its outer edge;
a flex arm connected to the fastener by means of a wire form;
said flex arm having a length of under three inches and having a proximal end away from the wire form;
said proximal end of the flex arm having a connection to an inside face of a placard;
said flex arm having a pliable construction with a memory to its last position; and
said placard having a clamp on its inside face and a logo on its outside face.

13. A two piece eyeglass comprising;
a left half having a lens with a nose oriented segment with a magnet;
a right half having a lens with a nose oriented segment with a coupling magnet to the left half magnet;
each left and right lens having an outside edge with a fastener;
each left and right fastener connected to a flexible arm means functioning to provide a flex and stay position for the flexible arm means;
each of said flexible arm means having a proximal end away from its respective fastener; and
each of said proximal ends having a clamp means to provide a removable attachment to an object on a user's head.

14. The eyeglass of claim 13, wherein each flexible arm means further comprises a twisted metal wire.

15. The eyeglass of claim 13, wherein each clamp means further comprises an all metal assembly having a pair of metal plates connected by a hinge and biased by a spring.

16. The eyeglass of claim 15, wherein the all metal assembly further comprises a placard.

17. The eyeglass of claim 15, wherein each outside edge fastener further comprises a wire form.

18. The eyeglass of claim 13, wherein the clamp means further comprises a clasp with a recess and a screw type fastener in the clasp.

19. The eyeglass of claim 13, wherein said clamp means further comprises a slidable fastener means along the flexible arm means.

20. The eyeglass of claim 19, wherein the slidable fastener means further comprises a lock means further comprises a lock means functioning to fix the slidable fastener means at a desired position along the flexible arm means.

* * * * *